United States Patent
Suzuki et al.

(10) Patent No.: US 10,606,635 B2
(45) Date of Patent: Mar. 31, 2020

(54) ACCELERATOR CONTROL APPARATUS, ACCELERATOR CONTROL METHOD, AND STORAGE MEDIUM

(71) Applicant: NEC CORPORATION, Tokyo (JP)

(72) Inventors: Jun Suzuki, Tokyo (JP); Masaki Kan, Tokyo (JP); Yuki Hayashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 168 days.

(21) Appl. No.: 15/572,634

(22) PCT Filed: May 10, 2016

(86) PCT No.: PCT/JP2016/002287
§ 371 (c)(1),
(2) Date: Nov. 8, 2017

(87) PCT Pub. No.: WO2016/181648
PCT Pub. Date: Nov. 17, 2016

(65) Prior Publication Data
US 2018/0107506 A1    Apr. 19, 2018

(30) Foreign Application Priority Data
May 12, 2015    (JP) .................................. 2015-097033

(51) Int. Cl.
*G06F 9/48* (2006.01)
*G06F 9/50* (2006.01)
*G06F 3/06* (2006.01)

(52) U.S. Cl.
CPC .......... *G06F 9/4806* (2013.01); *G06F 3/0604* (2013.01); *G06F 3/0631* (2013.01); *G06F 9/5016* (2013.01); *G06F 9/5027* (2013.01)

(58) Field of Classification Search
CPC ......... G06F 16/24542; G06F 16/24568; G06F 2212/254; G06F 8/4452; G06F 9/44; G06F 9/4881
See application file for complete search history.

(56) References Cited

U.S. PATENT DOCUMENTS 5,822,593 A * 10/1998 Lamping ................... G06F 8/30
717/161
2003/0137518 A1    7/2003 Hiwada et al.
(Continued)

FOREIGN PATENT DOCUMENTS

JP    2003-216943 A    7/2003
JP    2011-118744 A    6/2011
(Continued)

OTHER PUBLICATIONS

M. Ivanova et al., "An Architecture for Recycling Intermediates in a Column-Store," ACM Transactions on Database Systems, Nov. 2010, pp. 24:1-24:43, vol. 35, Issue 4, Article 24.
(Continued)

*Primary Examiner* — Dong U Kim
(74) *Attorney, Agent, or Firm* — Sughrue Mion, PLLC

(57) ABSTRACT

Provided is an accelerator control apparatus including a data management table storing a name assigned to data and an identifier for an accelerator that stores the data on a local memory by associating the name and the identifier; a data management unit that is configured to determine, when receiving a first process that accepts data assigned with the name as input data, the accelerator that stores the data on the local memory, by referring to the data management table; and a task processing unit that is configured to control the accelerator being determined by data management unit to execute the first process.

9 Claims, 11 Drawing Sheets

(56) References Cited

U.S. PATENT DOCUMENTS

| | | | |
|---|---|---|---|
| 2007/0169059 A1* | 7/2007 | Halambi | G06F 8/4452 |
| | | | 717/160 |
| 2011/0072234 A1* | 3/2011 | Chinya | G06F 12/1027 |
| | | | 711/207 |
| 2011/0161285 A1* | 6/2011 | Boldyrev | G06F 16/27 |
| | | | 707/609 |
| 2012/0072399 A1* | 3/2012 | Taitel | G06F 16/2237 |
| | | | 707/687 |
| 2013/0298130 A1* | 11/2013 | Pienaar | G06F 9/4887 |
| | | | 718/102 |
| 2014/0095444 A1* | 4/2014 | Deshmukh | G06F 16/24568 |
| | | | 707/661 |
| 2014/0136689 A1* | 5/2014 | Beaty | G06F 16/24568 |
| | | | 709/224 |
| 2016/0103677 A1* | 4/2016 | Melski | G06F 8/71 |
| | | | 717/120 |
| 2016/0344834 A1* | 11/2016 | Das | H04L 67/2842 |

FOREIGN PATENT DOCUMENTS

| | | |
|---|---|---|
| JP | 2013-025392 A | 2/2013 |
| WO | 2011/078162 A | 6/2011 |

OTHER PUBLICATIONS

Written Opinion of the International Searching Authority, dated Aug. 2, 2016 (PCT/ISA/237), English translation.
International Search Report for PCT/JP2016/002287, dated Aug. 2, 2016 (PCT/ISA/210), English translation.

* cited by examiner

Fig. 7

MEMORY MANAGEMENT TABLE 35

| ACCELERATOR NUMBER | PAGE NUMBER | IN-USE FLAG | DATA NUMBER | DIVISION NUMBER | LOCK FLAG |
|---|---|---|---|---|---|
| 51 | 1 | 1 | 82 | 1 | 1 |
| 51 | 2 | 1 | 62 | 3 | 1 |
| 51 | 3 | 1 | 65 | 1 | 0 |
| 51 | 4 | 0 | ... | ... | ... |
| ... | ... | ... | ... | ... | ... |
| 52 | 1 | 1 | 62 | 2 | 1 |
| 52 | 2 | 1 | 65 | 2 | 0 |
| 52 | 3 | 0 | ... | ... | ... |
| ... | ... | ... | ... | ... | ... |

Fig. 8

DATA MANAGEMENT TABLE 34

| DATA NUMBER | DIVISION NUMBER | CALCULATION COMPLETION FLAG | SWAP FLAG | ACCELERATOR NUMBER | PAGE NUMBER | PROCESS NUMBER | OBJECT FLAG | OBJECT NAME |
|---|---|---|---|---|---|---|---|---|
| 62 | 1 | 1 | 0 | 51 | 1 | - | 1 | pic |
| 62 | 2 | 1 | 0 | 52 | 1 | - | 1 | pic |
| 62 | 3 | 1 | 0 | 51 | 2 | - | 1 | pic |
| 65 | 1 | 0 | 0 | 51 | 3 | 1563 | 0 | - |
| 65 | 2 | 0 | 0 | 52 | 2 | 1563 | 0 | - |
| ... | ... | ... | ... | ... | ... | ... | ... | ... |

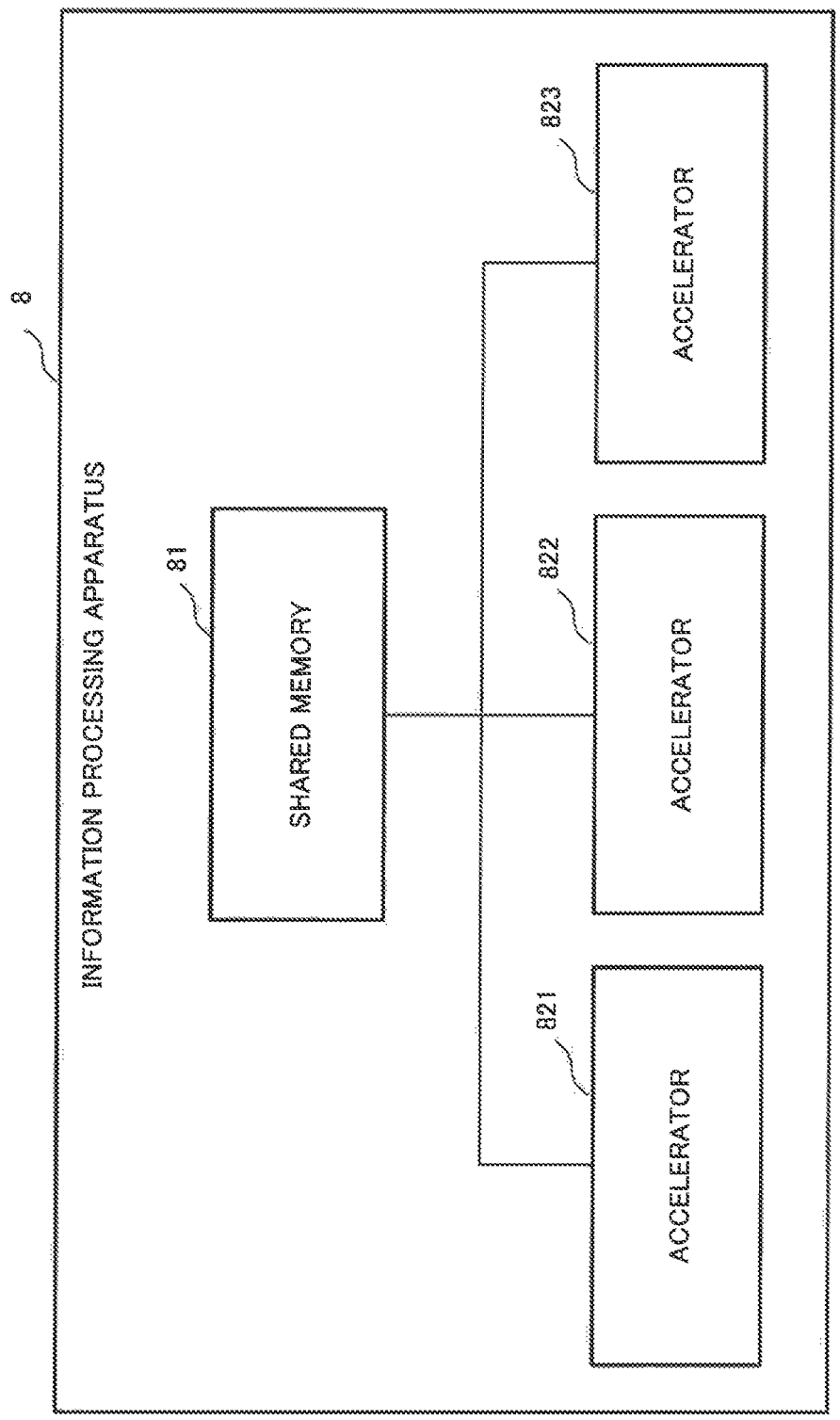

ACCELERATOR CONTROL APPARATUS, ACCELERATOR CONTROL METHOD, AND STORAGE MEDIUM

CROSS REFERENCE TO RELATED APPLICATIONS

This application is a National Stage of International Application No. PCT/JP2016/002287 filed May 10, 2016, claiming priority based on Japanese Patent Application No. 2015-097033, filed May 12, 2015, the contents of all of which are incorporated herein by reference in their entirety.

TECHNICAL FIELD

The present invention relates to an accelerator control apparatus, an accelerator control method, and a program, and in particular, to an accelerator control apparatus, an accelerator control method, and a program that control calculation using an accelerator.

BACKGROUND ART

PTL 1 describes one example of an accelerator control apparatus. As illustrated in FIG. 10, the accelerator control apparatus described in PTL 1 includes an information processing apparatus 8. The information processing apparatus 8 includes a shared memory 81 and a plurality of accelerators 821 to 823 connected to the shared memory 81.

The shared memory 81 stores data to be processed by the accelerators 821 to 823. The accelerators 821 to 823 process data transferred from the shared memory 81 to the accelerators 821 to 823. The accelerators 821 to 823 transfer again the processed data to the shared memory 81. The transfer and processing of data are repeated until a desired process is completed.

CITATION LIST

Patent Literature

[PTL 1] Japanese Laid-open Patent Publication No. 2013-025392

SUMMARY OF INVENTION

Technical Problem

It should be noted that the disclosed contents of the patent literature described above are incorporated and described in the present description by reference. The following analysis has been conducted by the present inventors.

The technique described in PTL 1 needs time to transfer data to an accelerator and therefore may not possible to execute calculation using an accelerator at high speed. Further, from the same reason, according to the technique, when calculation is executed by using a plurality of accelerators, the entire calculation time depending on the number of used accelerators may not be reduced.

Therefore, an issue is to execute calculation using an accelerator at high speed. An object of the present invention is to provide an accelerator control apparatus, an accelerator control method, and a program that contribute to a solution to the issue. Other issues and objects of the present invention will become apparent in description of example embodiments to be described later for carrying out the present invention.

Solution to Problem

An accelerator control apparatus according to the first aspect of the present invention includes: a data management table that is configured to store a name assigned to data and an identifier for an accelerator that stores the data on a local memory by associating the name and the identifier, data management means for determining, when receiving a first process that accepts data assigned with the name as input data, the accelerator that stores the data on the local memory, by referring to the data management table, and task processing means for causing the accelerator being determined by data management means to execute the first process.

An accelerator control method according to the second aspect of the present invention includes: storing a name assigned to data and an identifier for an accelerator that stores the data on a local memory, by associating the name of the data and the identifier, determining, when receiving a first process that accepts data assigned with the name as input data, the accelerator that stores the data on the local memory, by referring to the data management table, and causing the accelerator being determined to execute the first process.

A program according to the third aspect of the present invention causes a computer to execute processing of storing a name assigned to data and an identifier for an accelerator that stores the data on a local memory, by associating the name of the data and the identifier, processing of receiving a first process that accepts data assigned with the name as input data, processing of determining the accelerator that stores the data on the local memory, by referring to the data management table, and processing of causing the accelerator being determined to execute the first process. The program can be provided as a program product being stored in the non-transitory computer-readable storage medium.

Advantageous Effects of Invention

According to the accelerator control apparatus, the accelerator control method, and the program according to the present invention, calculation can be executed at high speed by using an accelerator.

BRIEF DESCRIPTION OF DRAWINGS

FIG. 7 is a diagram exemplarily illustrating a configuration of a memory management table in the accelerator control apparatus according to the first example embodiment.

FIG. 8 is a diagram exemplarily illustrating a configuration of a data management table in the accelerator control apparatus according to the first example embodiment.

FIG. 10 is a diagram for illustrating a related technique described in PTL 1.

DESCRIPTION OF EMBODIMENTS

First, an outline of one example embodiment will be described. A drawing reference sign appended to this outline is illustrative to assist understanding and is not intended to limit the present invention to an illustrated form.

Figure 1:
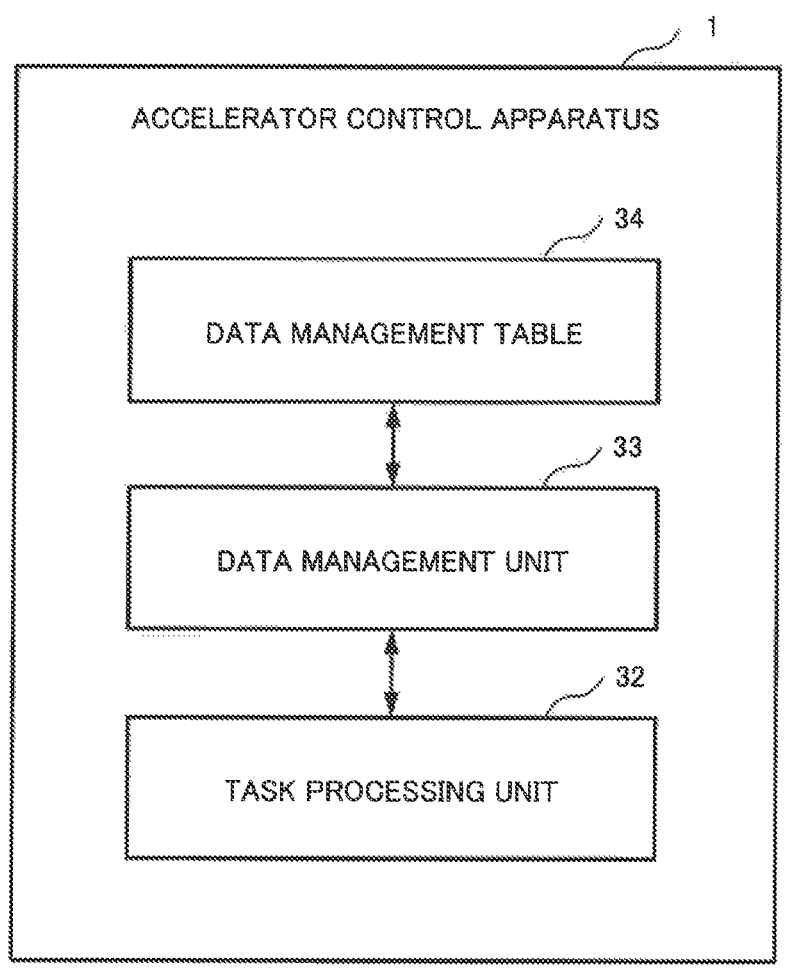
FIG. 1 is a block diagram exemplarily illustrating a configuration of an accelerator control apparatus according to one example embodiment.

FIG. 1 is a block diagram exemplarily illustrating a configuration of an accelerator control apparatus 1 according to one example embodiment. Referring to FIG. 1, the accelerator control apparatus 1 includes a data management table 34, a data management unit 33, and a task processing unit 32.

The data management table 34 stores a name (for example, an object name of FIG. 8) assigned to data and an identifier (for example, an accelerator number or a page number of FIG. 8) for identifying an accelerator that stores the data on a local memory by associating the name and the identifier with each other. The data management unit 33 determines, when receiving a first process (for example, a process included in a DAG illustrated in FIG. 4) that accepts data assigned with the name as input data, an accelerator that stores the data on a local memory by referring to the data management table 34. The task processing unit 32 causes the determined accelerator to execute the first process.

According to the configuration, by storing data to be used for processing previously on the local memory of the accelerator, it is unnecessary to load the data onto the local memory of the accelerator upon processing, and therefore calculation using the accelerator can be accelerated.

Further, the data management unit 33 may allocate a memory area to which output data of the first process is output on the local memory of the determined accelerator.

Thereby, the output data generated by processing of the accelerator can be stored on the local memory of the accelerator. Therefore, when processing is executed on an accelerator, it is unnecessary to transfer input/output data between the local memory of the accelerator and an external memory (for example, a main memory 4 of FIG. 2). Therefore, calculation using an accelerator can be further accelerated.

Further, when receiving a second process (for example, a "storeObject" to be described later) for storing particular data generated by a program beyond completion of the program, the data management unit 33 registers, in the data management table 34, a name assigned to the data to be stored and an identifier for identifying the accelerator that stores the data to be stored on the local memory, by associating the name and the idetifier with each other.

Thereby, data to be stored on the local memory of the accelerator beyond completion of a user program can be previously stored on the local memory of the accelerator.

Further, according to another example embodiment, the accelerator control apparatus 1 includes the data management unit 33 that causes the local memory of the accelerator to store data beyond completion of a user program; the data management table 34 that associates, from a name of data managed on the memory of the accelerator, the accelerator that stores the data with an address of the memory of the accelerator; and the task processing unit 32 that causes the accelerator to execute a process specified by a user regarding the data stored in the memory of the accelerator.

By the configuration, the accelerator control apparatus 1 operates to store data on an accelerator beyond completion of a user program and to cause the accelerator to execute, in response to a request of the user program, a process requested from the user program regarding the data stored on the accelerator. Further, by a request from the user program, the data are stored on the memory of the accelerator beyond completion of the user program.

When the configuration is employed, it is unnecessary to load data onto the memory of the accelerator each time the user program is executed, and thereby calculation using the accelerator can be executed at high speed.

Further, the accelerator control apparatus 1 may be configured to divide data used for calculation, store pieces of the divided data on memories of a plurality of accelerators, and cause each accelerator that stores a piece of the divided data to execute a process requested from a user.

According to the configuration, it is unnecessary to load data onto the memory of the accelerator at each time of calculation. Therefore, when calculation is executed by using a plurality of accelerators, the entire calculation time can be reduced according to the number of accelerators used.

First Example Embodiment

Next, an accelerator control apparatus according to a first example embodiment will be described in detail with reference to drawings.

Configuration

Figure 2:
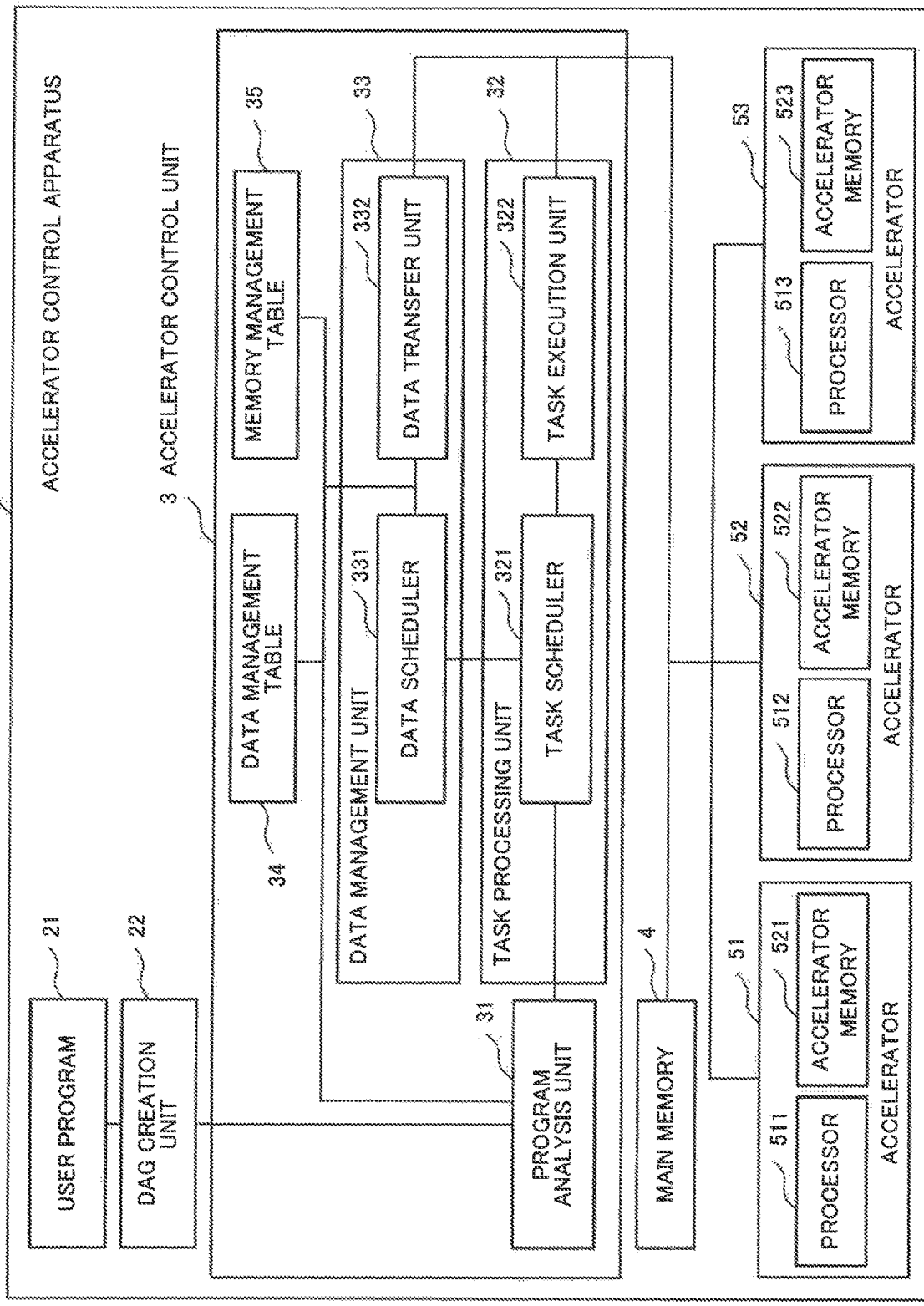
FIG. 2 is a block diagram exemplarily illustrating an accelerator control apparatus according to a first example embodiment.

Referring to FIG. 2, an accelerator control apparatus 1 according to the present example embodiment includes accelerators 51 to 53, a main memory 4, an accelerator control unit 3, a user program 21, and a directed acyclic graph (DAG) creation unit 22. The accelerator control apparatus 1 is realized, as one example, by a host computer. The user program 21 may be configured outside the accelerator control apparatus 1.

The accelerators 51 to 53 execute calculation processing.

The main memory 4 is a memory for saving data unable to be stored in the accelerators 51 to 53 due to an insufficiency of memory resources of the accelerators 51 to 53.

The accelerator control unit 3 controls the accelerators 51 to 53.

The DAG creation unit 22 creates a directed acyclic graph (DAG) indicating a process of the user program 21 by an API (Application Programming Interface) call of the user program 21 and transmits the created DAG to the accelerator control unit 3.

In FIG. 2, it is assumed that the number of accelerators is three for convenience of description. However, the number of accelerators may be any number equal to or larger than one and is not limited to the illustrated form. The accelerator is not specifically limited. The accelerator may be, for example, a GPU (Graphical Processing Unit) of NVIDIA Corporation, an Xeon Phi of Intel Corporation, or the like. The accelerator is a co-processor of a CPU (Central Processing Unit) in a computer. As one example, the accelerator may be mounted in the computer by being inserted into an I/O (Input/Output) slot of the computer.

Hereinafter, when description overlaps with respect to a plurality of accelerators 51 to 53, only the accelerator 51 will be described. The same description is applicable to the accelerators 52 and 53.

The accelerator 51 includes a processor 511 that processes data and an accelerator memory 521 that stores data. A local memory included in an accelerator is referred to also as an "accelerator memory".

The user program 21 is an application program created by a user being a programmer using the accelerators 51 to 53 or an application program executed by a user. The user program 21 is implemented by using an API provided by the DAG creation unit 22 as one example. The API provided by the DAG creation unit 22 includes, for example, two types of APIs, a reservation API and an execution API as illustrated in FIG. 3.

Figure 4:
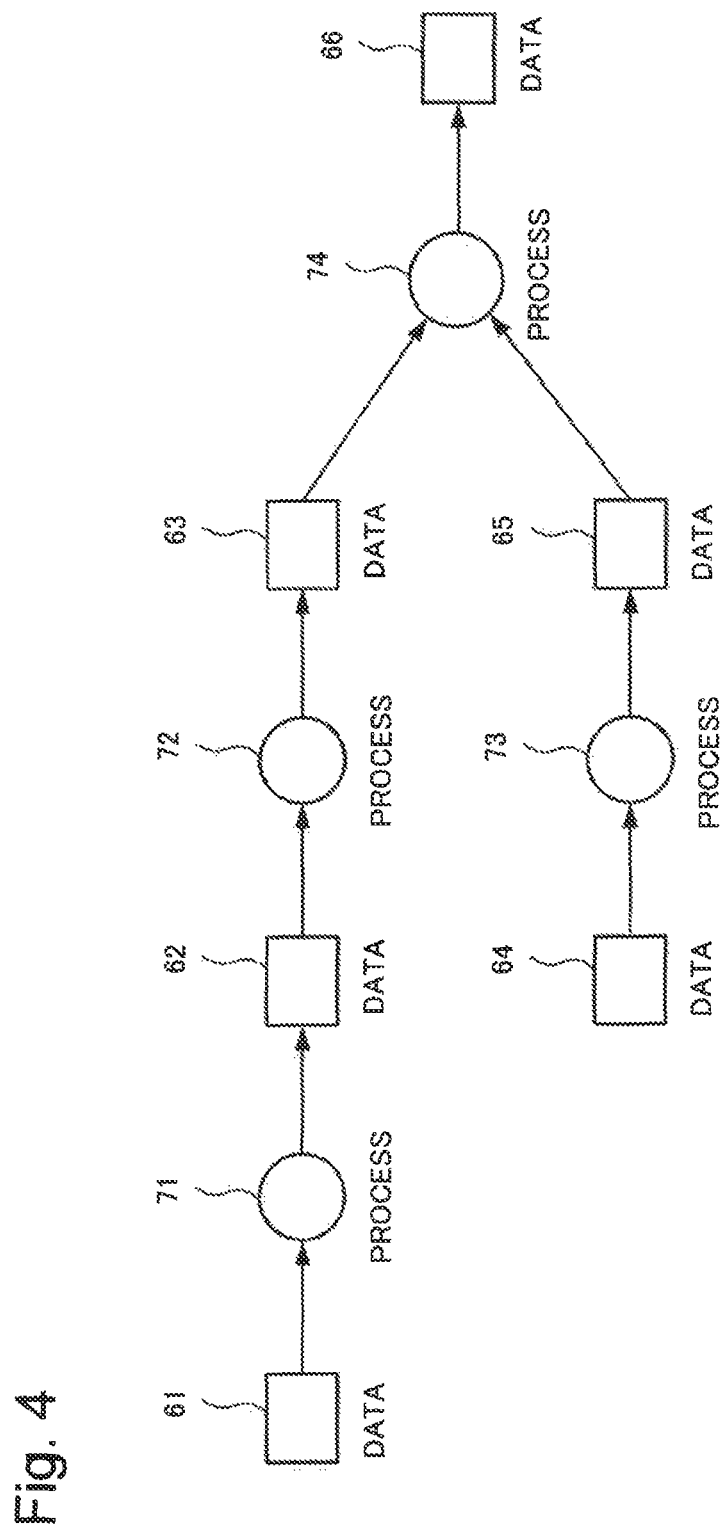
FIG. 4 is a diagram exemplarily illustrating a configuration of a directed acyclic graph (DAG) in the accelerator control apparatus according to the first example embodiment.

The reservation API corresponds to one "process" of the DAG illustrated in FIG. 4. When the reservation API is called from the user program 21, the DAG creation unit 22 adds one process and data generated by the process to a DAG. When, for example, a process 71 is called by using the reservation API for data 61 in FIG. 4, the DAG creation unit 22 adds the process 71 and data 62 that are output data of the process 71, to the DAG. The reservation API is an API for reserving a process. In other words, immediately after the reservation API is called, a DAG is generated but processing in the accelerators 51 to 53 is not executed.

On the other hand, when the execution API is called, there is a case where a new process and data generated by the process are added to a DAG, and a case where or a new process and data generated by the process are not added to a DAG. A call of the execution API triggers execution of a process of the DAG generated up to this point. A process belonging to the execution API is a process in which data after processing the DAG in the user program 21 are needed, and a process of a "storeObject" where data of a calculation result are stored as a data object on the accelerator memory, and the like.

Figure 3:
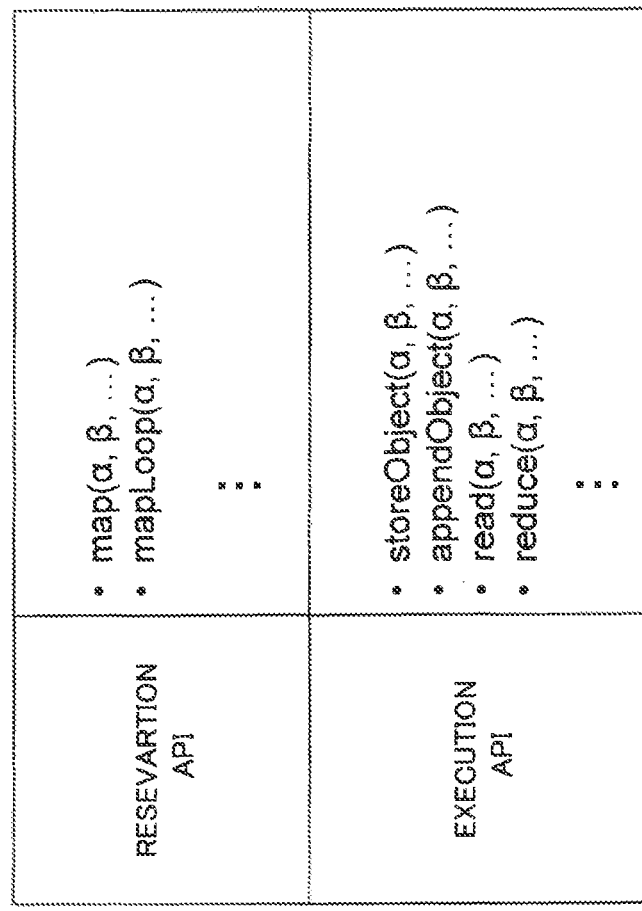
FIG. 3 is a diagram exemplarily illustrating a reservation API and an execution API in the accelerator control apparatus according to the first example embodiment.

The reservation API and the execution API may have one or a plurality of arguments "α", "β", "γ", . . . as illustrated in FIG. 3. One of these arguments may be a kernel function. The kernel function refers to a function indicating a process executed for data by the user program 21. Whether an API has a function as an argument depends on types of the reservation API and the execution API. The reservation API and the execution API each indicate a pattern of a process executed for data. An actual and specific process is executed by a kernel function provided as an argument of the reservation API and the execution API in a user program.

One example of an API having a kernel function as an argument is a "map". In the "map", the kernel function is applied to all elements configuring input data. Input data of a DAG are, for example, a table of an image and a database. When the "map" is applied to these pieces of data, the kernel function is applied individually to each pixel of the image and each entry of the database.

On the other hand, as an API that does not need a kernel function, includes, for example, a "storeObject", an "appendObject", and a "read". The "storeObject" is an API that stores a calculation result as a data object on accelerator memories 521 to 523. By the "storeObject", data stored as a data object on the accelerator memories 521 to 523 can be named. At that time, the name of the object is specified as an argument of the "storeObject". The "appendObject" is an API used to append data to a tail end of an already-existing object. The "read" is an API that acquires, in a user space, a content of a data object existing on the accelerators 51 to 53.

A data object stored on the accelerator memories 521 to 523 can be specified as input data of a process indicated by a DAG. In this case, a name of the object stored in the accelerators 51 to 53 is specified as input data of a process executed by the reservation API and the execution API. This name is provided by the program having called the "storeObject".

Figure 5:
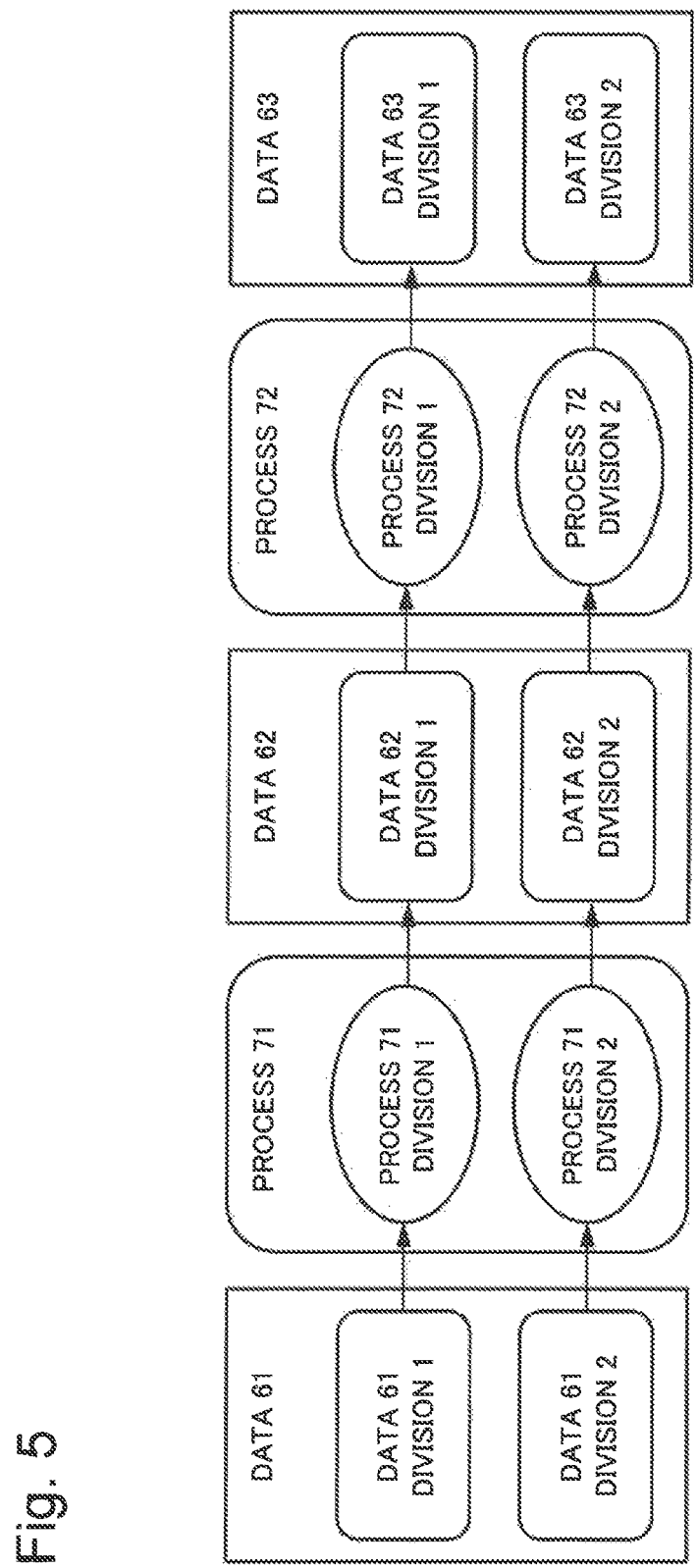
FIG. 5 is a diagram for illustrating division of data and a process in the accelerator control apparatus according to the first example embodiment.

Each piece of data of the DAG may include two or more divisions as illustrated in FIG. 5. FIG. 5 is an example in which in data 61, a process 71, data 62, a process 72, and data 63 of the DAG of FIG. 4, data includes two divisions. In this case, for example, a result obtained by applying the process 71 to both "data 61 division 1" and "data 61 division 2" is the same as a result obtained by applying a process in which the data 61 are not divided. This processing pertains to a processing mode referred to as data parallel in technology of parallel calculation and generally known among engineers in a technical field regarding the present invention. In FIG. 5, processing for "data 61 division 1" is described as "process 71 division 1", or the like, but a processing content for "process 71 division 1" is the same as in the process 71 in FIG. 4. Further, different accelerators may execute processing for a plurality of divisions in a distributed manner.

Figure 6:
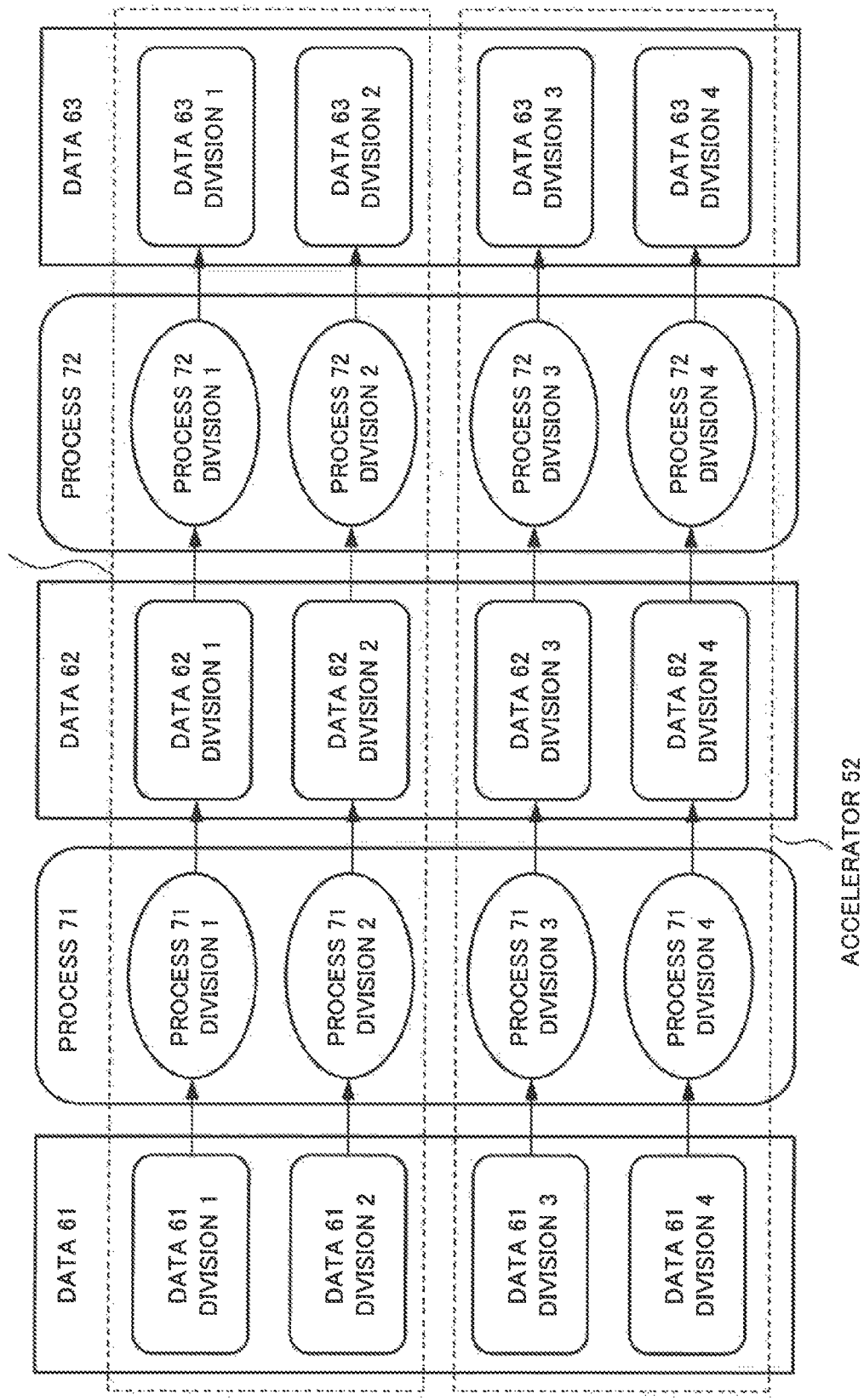
FIG. 6 is a diagram for illustrating division of data and a process in the accelerator control apparatus according to the first example embodiment.

FIG. 6 illustrates a case where the data 61 are divided into "data 61 division 1", "data 61 division 2", "data 61 division 3," and "data 61 division 4". The "data 61 division 1" and the "data 61 division 2" are processed by the accelerator 51. On the other hand, the "data 61 division 3" and the "data 61 division 4" are processed by the accelerator 52. In this case, compared to a case where all of the four data divisions are processed by one accelerator, ideally, twice calculation performance is achieved.

In the following description, when it is not possible to be misunderstood, a case where each piece of data or a process is divided will be described, and description on a case where each piece of data or a process is not divided will be omitted. Therefore, when each piece of data is not divided, a data division in the following description means all pieces of data, and processing for the data division means processing for all the pieces of data.

The DAG creation unit 22 generates a DAG when the user program 21 calls the reservation API and the execution API. When the reservation API is called, the DAG creation unit 22 adds a corresponding process and corresponding output data to the DAG. On the other hand, when the execution API is called, the DAG creation unit 22 adds a process and output data to the DAG when the addition is necessary and notifies the accelerator control unit 3 of the DAG generated up to this point.

The DAG created by the DAG creation unit 22 includes a type of the reservation API or the execution API called by the user program 21 and a kernel function provided for each API. Further, the DAG creation unit 22 transmits, upon notification of the DAG, an identifier of the user program 21.

Further, when the user program 21 is terminated, the DAG creation unit 22 transmits the identifier of the user program 21 to the accelerator control unit 3 and makes a request for deleting, in the data generated by the user program 21, intermediate data other than data specified to be stored by the "storeObject".

Referring to FIG. 2, the accelerator control unit 3 includes a program analysis unit 31, a task processing unit 32, a data management unit 33, a data management table 34, and a memory management table 35. The program analysis unit 31 analyzes a DAG indicating a process of the user program 21 received from the DAG creation unit 22. The task processing unit 32 executes the process of the DAG. The data management unit 33 manages and prepares data necessary for the process of the DAG. The memory management table 35 manages a memory of an accelerator. The data management table 34 manages data on the memory of the accelerator. Hereinafter, each configuration thereof will be described in detail.

The memory management table 35 is a table that manages the accelerator memories 521 to 523. The accelerator memories 521 to 523 are managed by being divided into pages of particular size. The page size is, for example, 4 KB or 64 KB. The memory management table 35 stores, as illustrated in FIG. 7, information relating to each page as an entry. The information of each page includes an accelerator number indicating the accelerator to which the page belongs and a page number. Further, the information of each page includes an in-use flag indicating that the page is being used and a data number indicating an identifier of data stored by the page when the page is being used. Further, the information of each page includes a division number indicating which division in data the data stored by the page belong to and a lock flag indicating that the page is being used for calculation and is prohibited from being released. The in-use flag and the lock flag each are represented by a Boolean value. An identifier of data is allocated to data of a DAG.

As one example, the in-use flag indicates "1" when a page is being used and indicates "0" in a case other than this. Further, the lock flag indicates "1" when a release of a page is prohibited and indicates "0" in a case other than this.

A first entry of the memory management table 35 illustrated in FIG. 7 indicates that, for example, a page 1 of the accelerator 51 is used by a division 1 of data 62, and the page is being currently used for calculation and therefore is being locked. It should be noted that data stored by a page being locked cannot be saved on the main memory 4.

The data management table 34 manages data on the accelerator memories 521 to 523. The data management table 34 stores, as illustrated in FIG. 8, information relating to data in a DAG transmitted from the user program 21. Each entry includes a data number, a division number of each piece of data, and a calculation flag indicating whether or not the data have been already calculated. Each entry also includes a swap flag indicating that the data are being saved on the main memory 4. Further, each entry incudes an accelerator number indicating an accelerator that stores the data and a page number int the accelerator that stores the data. In addition, each entry includes a process number that is an identifier of the user program 21 having generated the data. Each entry includes an object flag indicating that the data are a data object stored on a memory of an accelerator beyond completion of the user program 21 and an object name indicating a name of the object when the object flag is being set. The calculation completion flag, the swap flag, and the object flag each are represented by a Boolean value.

As one example, the calculation completion flag indicates "1" when calculation has been completed and indicates "0" in a case other than this. The swap flag indicates "1" when data are saved on the main memory 4 and indicates "0" in a case other than this. The object flag indicates "1" when data are a data object stored on a memory of an accelerator beyond completion of the user program 21 and indicates "0" in a case other than this.

For example, a first entry of the data management table 34 illustrated in FIG. 8 indicates that a division 1 of data having a data number 62 has been already calculated and is being stored on a page 1 of the accelerator 51. The data are a data object stored on a memory of an accelerator beyond completion of the user program 21 and an object name is "pic". From an accelerator number and a page number stored by an entry of the data management table 34, it is possible to retrieve information of a page used by each piece of data by referring to a corresponding entry of the memory management table 35 and to lock the page when used for calculation.

The program analysis unit 31 analyzes a DAG indicating a process of a user received from the DAG creation unit 22 and divides the DAG into data and a process. The program analysis unit 31 creates an entry in the data management table 34 for data in the DAG. The program analysis unit 31 creates the number of entries corresponding to a data division number. When an entry of data has been created, each data division has not been calculated yet, and therefore a calculation completion flag in the data management table 34 is "0".

On other hand, with regard to data, as input data of a DAG, output by the DAG anterior to this time of the user program 21 and data of a data object previously created by different user program from the user program 21 and stored on a memory of an accelerator, an entry already exists. Therefore, it is not necessary for the program analysis unit 31 to newly create entries of these pieces of data. Further, calculation completion flags of these entries are being set as "1" in the data management table 34.

The program analysis unit 31 requests the task processing unit 32 to execute a process divided into units of "processes" of a DAG. The program analysis unit 31 requests processes in accordance with a data division number with respect to one process of the DAG. The program analysis unit 31 receives a completion notification of the user program 21 from the DAG creation unit 22 and deletes, among pieces of data generated by execution of a DAG by the user program 21, an entry of a division regarding data other than a data object stored beyond completion of the program from the data management table 34. The program analysis unit 31 releases an in-use flag (for example, changes an in-use flag from "1" to "0") of the memory management table 35 with respect to a page having been used by the deleted entry and thereby releases the accelerator memories 521 to 523.

The data management unit 33 includes a data scheduler 331 and a data transfer unit 332.

The data scheduler 331 makes an instruction for managing data stored on the accelerator memories 521 to 523 and allocating a memory. The data transfer unit 332 loads the data onto the accelerators 51 to 53 and allocates the accelerator memories 521 to 523.

The data scheduler 331 refers to the memory management table 35 and manages the accelerator memory 521 of the accelerator 51. The data scheduler 331 manages the other accelerators 52 and 53 in the same manner. The data scheduler 331 receives a request for input data and output data necessary for executing a process from the task processing unit 32.

When a process to be executed is a first process of a DAG, an identifier for a data object stored on an accelerator memory has been specified as input data. Further, when a process to be executed is a process other than the first process, upon completion of a process of a previous step in the DAG, output data of the process have been already calculated. In any of the cases, when the swap flag for entries corresponding to these pieces of data is "0" in the data management table 34, divisions of these pieces of data are not saved on the main memory 4, and therefore preparation for using these pieces of data on an accelerator memory has been completed.

On the other hand, when the swap flag is "1," the data scheduler 331 prepares the division on the accelerator memory. The data scheduler 331 refers to the memory management table 35 and confirms whether or not there are sufficient free pages for loading saved data divisions in any one of the accelerators 51 to 53. When there are sufficient free pages, the data scheduler 331 requests the data transfer unit 332 to load the saved data onto the free pages. On the other hand, when free pages are insufficient, the data scheduler 331 refers to the data management table 34 and the memory management table 35, selects a division of data to be stored on an unlocked page, and requests the data transfer unit 332 to save (move) the division into the main memory 4. The data scheduler 331 makes a saving request for a division of data as a unit. Thereby, a memory for loading input data can be allocated, and therefore the data scheduler 331 notifies the data transfer unit 332 to load a division of the input data.

With respect to output data of a process, the data scheduler 331 refers to the memory management table 35 and requests, when a page number necessary for the output data of the process requested by the task processing unit 32 can be allocated from free pages, the data transfer unit 332 to allocate a memory. At that time, the data scheduler 331 also specifies the accelerator for allocating the pages.

On the other hand, in a case where free pages cannot be allocated, the data scheduler 331 operates to allocate a memory in the same manner as described above, in order to load saved input data. In other words, the data scheduler 331 first notifies the data transfer unit 332 to save, on the main memory 4, divisions of data stored on unlocked pages on the accelerator memory and then instructs the data transfer unit 332 to allocate pages for outputting output data.

The data scheduler 331 requests the data transfer unit 332 to lock a memory area of input data and output data. The data scheduler 331 receives a completion notification of processing from the task processing unit 32, and notifies the data transfer unit 332 to release a lock of a page being locked and set a calculation completion flag of output data in the data management table 34 as "1".

Only any one of input data and an output memory area may be prepared, depending on the type of process requested by the task scheduler 321 to be executed. For example, in an execution request for the "read" for acquiring a content of a data object, it is unnecessary to prepare an output memory area.

When a request from the task scheduler 321 is not to preparation for input data and an output memory area but is a "storeObject" for storing already-existing data beyond completion of the user program 21, the data scheduler 331 requests the data transfer unit 332 to set an object flag of an entry of the data management table 34 for corresponding data and to register an object name specified in the request, into the entry.

The data transfer unit 332 receives an instruction from the data scheduler 331, and thereby allocates a memory of an accelerator and transfers data to the accelerator.

The data transfer unit 332 receives an instruction from the data scheduler 331, and thereby allocates a memory of an accelerator and registers an entry of a page of the allocated memory in the memory management table 35. Further, the data transfer unit 332 registers an accelerator number and a page number corresponding to the allocated memory in an entry of a division of data of the data management table 34.

The data transfer unit 332 receives an instruction from the data scheduler 331 and sets a lock flag of a page being used for calculation as "1". The data transfer unit 332 releases a lock flag of a page for which calculation is completed from "1" to "0". Furthermore, the data transfer unit 332 sets a calculation completion flag of output data as "1" in the data management table 34.

The data transfer unit 332 receives an instruction from the data scheduler 331 and saves (moves) a data division on the main memory 4. In this case, the data transfer unit 332 sets a swap flag for an entry of the data management table 34 with respect to the saved data division. Further, the data transfer unit 332 releases an in-use flag for an entry of the memory management table 35 with respect to a page having been used by the saved data division.

The data transfer unit 332 receives an instruction from the data scheduler 331, and thereby sets an object flag of an entry of the data management table 34 with respect to data stored on a memory of an accelerator beyond completion of the user program 21 and registers an object name in the entry.

The task processing unit 32 includes a task scheduler 321 and a task execution unit 322. The task scheduler 321 requests a memory area of input data and output data necessary for executing a process and requests execution of the process. The task execution unit 322 controls the accelerators 51 to 53 to execute the process.

The task scheduler 321 receives an execution request for a process included in a DAG from the program analysis unit 31. The task scheduler 321 receives the request in a unit of process execution for a data division. The task scheduler 321 executes a process in order from upstream of the DAG among requested processes received. In the DAG illustrated in FIG. 4, a process 71 and a process 73 are an upstream process. In the DAG, when an upstream process has not been completed, a downstream (next-stage) process cannot be executed. The task scheduler 321 requests the data scheduler 331 for a memory area of input data and output data necessary for each process to be executed. After receiving completion of allocating data and a memory area for a process requested from the data scheduler 331, the task scheduler 321 notifies the task execution unit 322 of information relating to an accelerator number, an address of input data, and an address where output data is written, which are necessary for executing the corresponding process, or information relating to an entry of the data management table 34 and an entry of the memory management table 35, which are necessary for knowing these pieces of information, and instructs the task execution unit 322 to execute the process. The process is executed in a unit of a data division.

When a process to be requested is an "appendObject" for appending data to a data object stored on an accelerator, the task scheduler 321 transfers information to be appended to the task execution unit 322. The data are received while the program analysis unit 31 receives a DAG of the user program 21.

The task scheduler 321 receives a completion notification of the process from the task execution unit 322 and notifies the data scheduler 331 to release a lock of the input data and the output data since the process has been completed.

Further, when a process which is requested to the task execution unit 322 is the "read" for acquiring a content of a data object stored on a memory of an accelerator, the task scheduler 321 acquires data from the tack execution unit 322 having executed the "read" and transmits the acquired data to the user program 21 via the program analysis unit 31.

Further, when a process requested from the program analysis unit 31 is a "storeObject" the task scheduler 321 requests the data scheduler 331 to store data being already calculated as a data object beyond completion of the user program 21.

The task execution unit 322 receives an instruction from the task scheduler 321 and executes processing for a specified input address and output address of a specified accelerator, by using a kernel function of the user program 21 received from the task scheduler 321. The task execution unit 322 notifies the task scheduler 321 of processing completion. When a requested process is an "appendObject", the task execution unit 322 appends data to a specified data object. On the other hand, when a requested process is the "read" for acquiring a content of a data object, the task execution unit 322 acquires information from a corresponding address of a specified data object and notifies the task scheduler 321 of the acquired information.

[Operation]

Figure 9A:
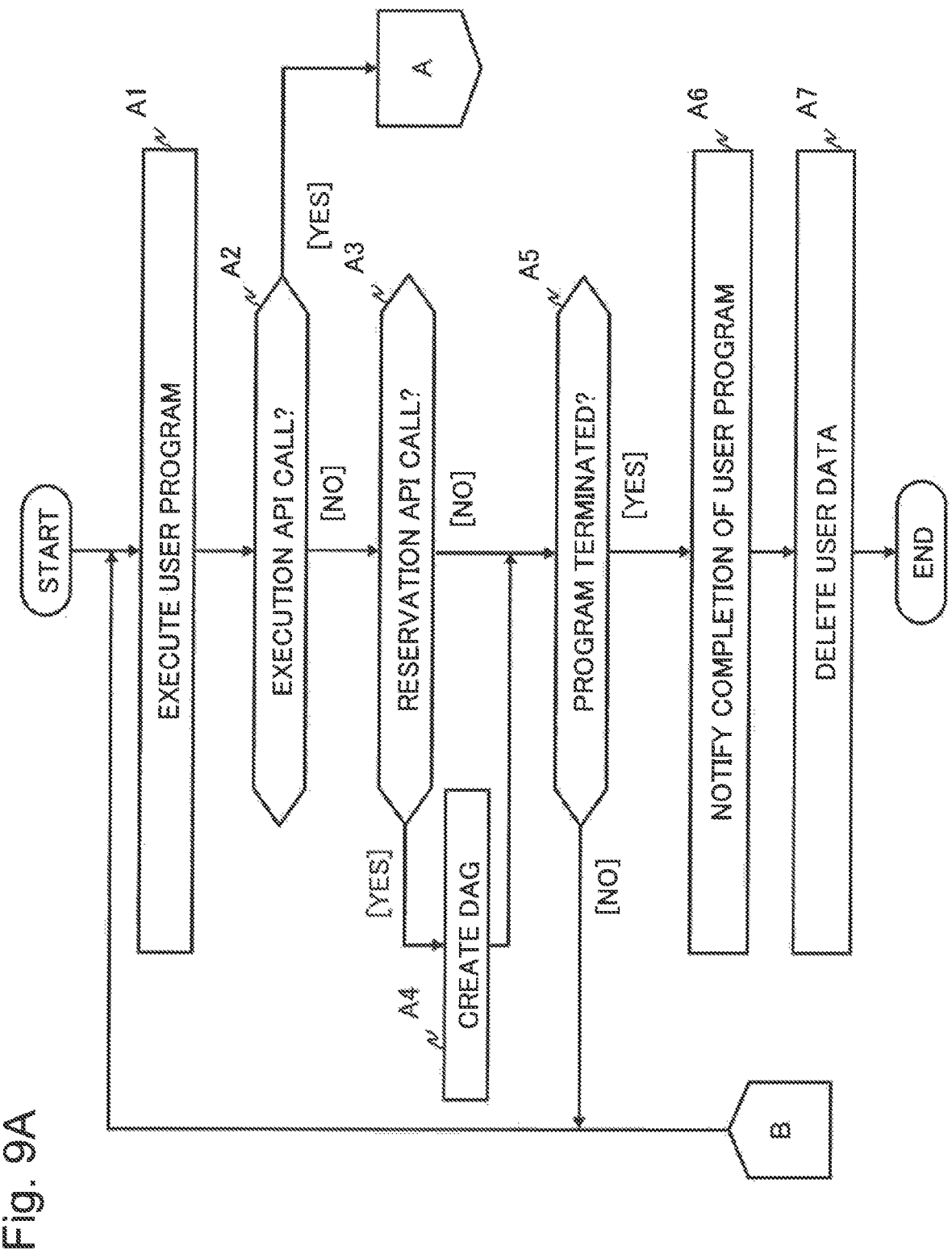
FIG. 9A is a flow diagram (1/2) exemplarily illustrating an operation of the accelerator control apparatus according to the first example embodiment.
Figure 9B:
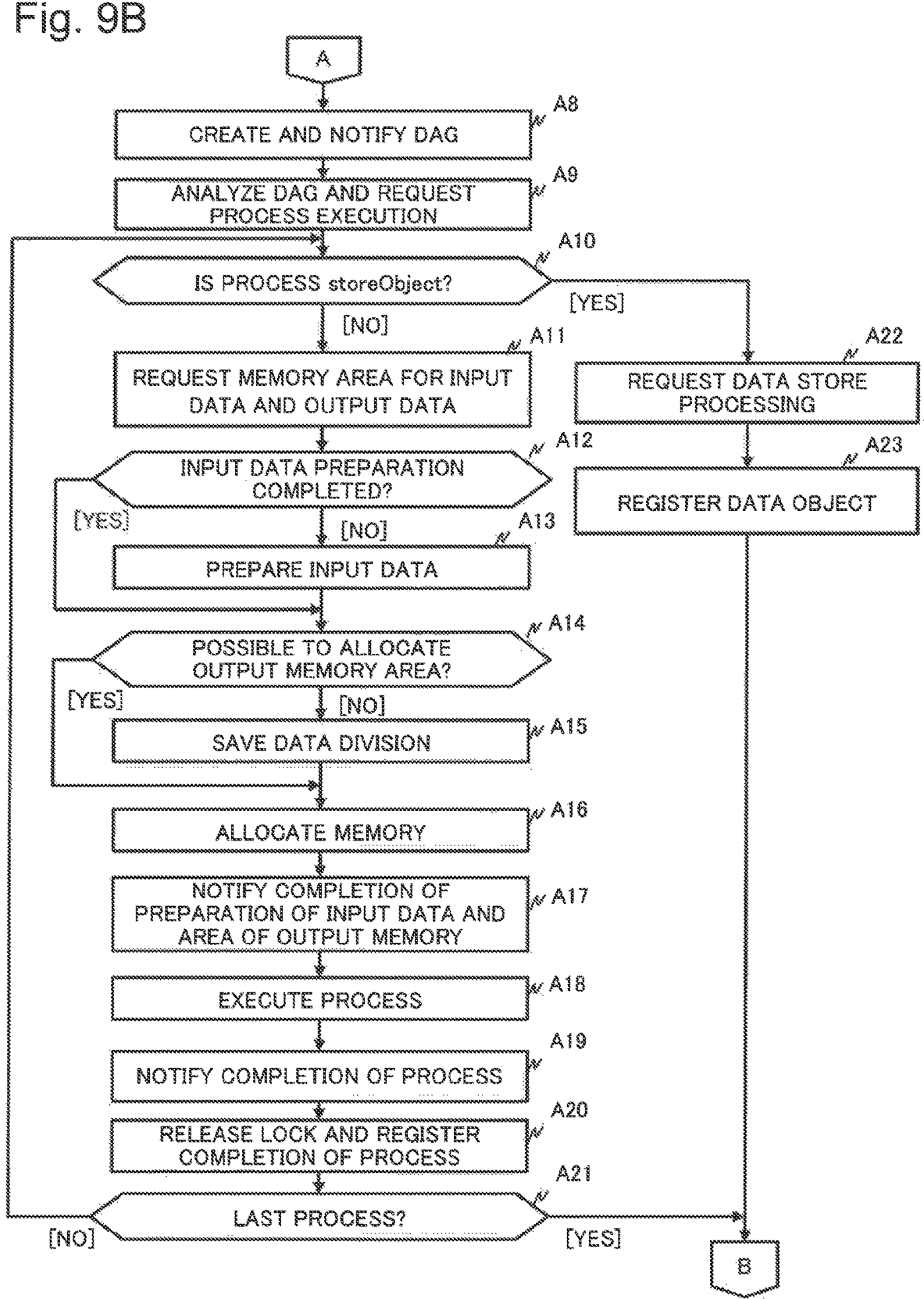
FIG. 9B is a flow diagram (2/2) exemplarily illustrating an operation of the accelerator control apparatus according to the first example embodiment.

Next, an operation of the present example embodiment will be described in detail with reference to FIG. 2, FIG. 9A, and FIG. 9B. FIG. 9A and FIG. 9B are a flow diagram exemplarily illustrating an operation of the accelerator control apparatus 1 according to the present example embodiment. Processing following "A" indicated in FIG. 9A is continued from "A" indicated in FIG. 9B. Further, processing following "B" indicated in FIG. 9B is continued from "B" indicated in FIG. 9A.

First, a user program 21 created by using a reservation API and an execution API is executed (step A1).

When the user program 21 calls the execution API (Yes of step A2), the DAG creation unit 12 proceeds to a process for notification of a DAG generated up to this point.

On the other hand, in a case of no execution API call (No of step A2), the DAG creation unit 22 confirms whether to be a reservation API call (step A3).

In a case of a reservation API call (Yes of step A3), the DAG creation unit 22 adds a process specified by the reservation API and data to a DAG generated up to this point (step A4).

When the user program 21 is terminated (Yes of step A5), the DAG creation unit 22 notifies the accelerator control unit 3 of completion of the user program 21 (step A6).

The program analysis unit 31 deletes, based on this notification, a piece of data other than a data object stored beyond the completion of the user program 21 among pieces of data generated by the user program 21 (step A7). Specifically, the program analysis unit 31 deletes, in the data management table 34, a division of data in which an identifier of the user program 21 is written as the process number and in which the object flag is not asserted. After completion of the data deletion, execution of the user program 21 is completed.

Further, when the user program is not terminated (No of step A5), the processing returns to step A1 and the user program continues to be executed.

When the execution API is called (Yes of step A2), the DAG creation unit 22 adds the last process and data to a DAG as necessary and notifies the program analysis unit 31 of the DAG (step A8).

The program analysis unit 31 receives the DAG and individually breaks down processes configuring the DAG.

Next, the program analysis unit 31 requests the task processing unit 32 to execute each process (step A9). The execution of the requested process is performed in a unit of a data division. For example, in a process 71 illustrated in FIG. 5, the process 71 includes two parts of "process 71 division 1" and "process 71 division 2", and therefore two individual processes are generated by the program analysis unit 31 and the task processing unit 32 is requested to execute the processes. Hereinafter, a process for an individual data division will be simply referred to as a "process".

The task scheduler 321 performs execution in order from a process located upstream of the DAG in a request for processes received from the program analysis unit 31.

First, when a content of a process is the "storeObject" for storing data of a user as data object of an accelerator memory beyond completion of the user program 21 (Yes of step A10), the task scheduler 321 requests the data management unit 33 to store the user program 21 (step A22).

The data scheduler 331 receives a request for the "storeObject", refers to the data management table 34, sets an object flag of a corresponding entry, and requests the data transfer unit 332 to delete a process number. The data transfer unit 332 executes the specified process. Further, in the request for the "storeObject", a name of the data object is specified, and therefore the data scheduler 331 instructs the data transfer unit 332 to register the object name (step A23).

On the other hand, when a request for a process is not a "storeObject" (No of step A10), the task scheduler 321 requests the data management unit 33 for a memory area for input data and output data necessary for executing a next process (step A11).

The data scheduler 331 refers to the data management table 34 and determines that the data are in a preparation completion state when a swap flag of the requested data is not set as "1" (Yes of step A12). The data scheduler 331 requests the data transfer unit 332 to set a lock flag of an entry corresponding to a memory page used by the input data in the memory management table 35.

On the other hand, when a swap flag of the requested data has been set as "1" (No of step A12), the task scheduler 321 refers to the memory management table 35. When there is the accelerator having a free memory area sufficient for storing data saved on the main memory 4, the task scheduler 321 requests the data transfer unit 332 to control the accelerator to load the input data. The data transfer unit 332 loads the input data on the specified accelerator and updates a swap flag, an accelerator number, and a page number of corresponding data in the data management table 34 (step A13). The data scheduler 331 updates an in-use flag, a data number, and a division number for a page used by the loaded data in the memory management table 35. The data scheduler 331 sets a lock flag as "1" in the memory management table 35.

On the other hand, when there is no accelerator having a enough free memory area sufficient for storing data saved on the main memory 4, the data scheduler 331 refers to the memory management table 35, selects data using a page of which lock flag is not set, and requests the data transfer unit 332 to save the selected data on the main memory 4. The data transfer unit 332 saves the specified data and updates a swap flag, an accelerator number, and a page number in the data management table 34. When the data are saved on the main memory 4, the accelerator number and the page number of the data are set as invalid. The data scheduler 331 continues to request for saving data until the memory area necessary for loading input data on an accelerator is released. When a memory for loading input data has been released, processing for loading data is the same as processing for loading data when there is an accelerator including a free memory area sufficient for storing data saved on the main memory 4.

Next, the data scheduler 331 confirms whether or not an accelerator that stores input data of a process can allocate an output memory area of a requested process (step A14). When a free memory area is sufficient, it is determined that the area can be allocated (Yes of step A14).

On the other hand, when a free memory area is insufficient (No of step A14), the data scheduler 331 refers to the memory management table 35 and requests the data transfer unit 332 to save data using a page for which a lock flag is not set. An operation (step A15) for saving the specified data by the data transfer unit 332 is the same as an operation upon saving data in step A13.

When a memory area sufficient for storing output data has been released in the accelerator, the data scheduler 331 requests the data transfer unit 332 to allocate a memory of the output data (step A16).

The data transfer unit 332 allocates a memory and writes an accelerator number and a page number in an entry corresponding to the output data in the data management table 34. The data transfer unit 332 sets a lock flag for a page being used by the memory area in the memory management table 35. The data scheduler 331 notifies, when a memory area of the input data and the output data has been prepared on an accelerator, the task processing unit 32 of preparation completion of the data (step A17).

The task scheduler 321 receives the data preparation completion notification and requests the task execution unit 322 to execute the process (step A18).

When a request for a process to be executed is execution of a kernel function provided by the user program 21, the task execution unit 322 controls the accelerator that stores data to execute the kernel function for input data, and to output a result to an output memory area. On the other hand, when a request for a process to be executed is the "read" of data, the task execution unit 322 reads data from the accelerator that stores the data and notifies the task scheduler 321 of the read data. When a request for a process to be executed is the "append" for appending data, the task execution unit 322 writes provided data on a memory area of the accelerator that stores data. The task scheduler 321 notifies, when the process executed by the task execution unit 322 has been completed, the data management unit 33 of process completion (step A19).

The task scheduler 321 releases a lock flag in the memory management table 35 for the input data and the output data in which the process has been completed and requests the data transfer unit 332 to set a calculation completion flag of a corresponding entry in the data management table 34 for the output data (step A20). The data transfer unit 332 executes the requested process.

The task scheduler 321 continues to request data of a process and execute the process until all the processes of a DAG requested from the program analysis unit 31 are completed (No of step A21).

On the other hand, when the processes of the DAG are completed (Yes of step A21), the processing returns to step A1.

As described above, in the accelerator control apparatus 1 of the present example embodiment, the program analysis unit 31 receives the DAG indicating a process of the user program 21 from the DAG creation unit 22, divides the process into processes configuring the DAG, and requests the task scheduler 321 to execute the processes. The task scheduler 321 requests the data scheduler 331 for input data necessary for the process and the memory area necessary for outputting a calculation result. The data scheduler 331 refers to the data management table 34, confirms that input data specified by the name stored on the accelerator memory, locks the area, and further allocates and locks the output memory area. The task scheduler 321 receives a notification of the preparation completion of the input data and the output data, and requests the task execution unit 322 to execute the process in the accelerator that stores the data.

The accelerator control apparatus 1 of the present example embodiment stores data on the memory of the accelerator beyond completion of the user program 21, based on the configuration and operation. Thereby, it is not necessary to load data onto the accelerator after a start of the user program 21, and data stored on the accelerator can be calculated. Thereby, a cost for loading data can be reduced and calculation using an accelerator can be accelerated. Further, in the present example embodiment, data are divided and stored on a plurality of accelerators, a process of the user program is divided, and the accelerator that stores a division of each piece of data is controlled to execute the process in a distributed manner. Thereby, a cost of loading data onto the accelerator can be reduced and processing time can be reduced according to the number of accelerators used.

Second Example Embodiment

Next, a second example embodiment will be described. In the present example embodiment, a computer including a CPU (Central Processing Unit) and a memory is caused to execute the operation of the accelerator control apparatus according to the first example embodiment. Specifically, the CPU is configured to execute the functions of the user program 21, the DAG creation unit 22, the program analysis unit 31, the task scheduler 321, the task execution unit 322, the data scheduler 331, and the data transfer unit 332. The memory of the computer is used as the data management table 34, the memory management table 35, and the main memory 4. The memory is any storage device in a broad sense, and includes a semiconductor memory, a hard disk, and a flash memory, which are generally referred to as a secondary storage. The accelerator may be inserted into an I/O slot of the computer. Alternatively, the accelerator and the computer can be connected by using an interconnection for an I/O device.

According to the present invention, it is applicable to an intended purpose for increasing a processing speed of a calculation apparatus including one or more accelerators.

Following form of embodiment may also be included in the present invention.

[Form 1]
The accelerator according to the first aspect of the present disclosure as described above.

[Form 2]
The accelerator control apparatus according to the Form 1, wherein the data management unit allocates a memory area to which output data of the first process are output, on the local memory of the accelerator being determined.

[Form 3]
The accelerator control apparatus according to the Forms 1 or 2, wherein
when receiving a second process for storing data on the local memory of the accelerator beyond completion of a program having generated the data, the data management unit associates the name assigned to the data to be stored with the identifier for the accelerator that stores the stored data on the local memory, and registers the name of the data and the identifier in the data management table.

[Form 4]

The accelerator control apparatus according to any one of Forms 1 to 3, further including:

program analysis unit for receiving a process request from a user program as a directed acyclic graph (DAG) and requesting the task processing unit to execute a process included in the DAG, wherein the data management unit determines the accelerator that stores input data of the process included in the DAG on the local memory, and the task processing unit causes the accelerator determined to store input data of the process included in the DAG on the local memory, to execute a process included in the DAG.

[Form 5]

The accelerator control apparatus according to Form 4, wherein input data of a process included in the DAG are divided and stored on a plurality of local memories of a plurality of accelerators, the data management unit determines the plurality of accelerators that store input data of a process included in the DAG on local memories, and the task processing unit controls each of the plurality of the accelerators being determined to execute the process included in the DAG.

[Form 6]

The accelerator control apparatus according to any one of Forms 1 to 5, wherein when input data of the first process are being saved on an outside of the accelerator, the data management unit loads the saved data onto the accelerator and, when there is no sufficient free area in the local memory of the accelerator, the data management unit loads input data of the first process, after saving another piece of data on an outside of the accelerator.

[Form 7]

The accelerator control apparatus according to any one of Forms 1 to 6, wherein the data management unit allocates a memory area to which output data of the first process are output on the local memory of the accelerator being determined, after saving another piece of data on an outside of the accelerator being determined, when there is no sufficient free area to allocate a memory area to which output data of the first process are output on the local memory of the accelerator being determined.

[Form 8]

The accelerator control method according to the second aspect of the present disclosure.

[Form 9]

The accelerator control method according to Form 8, further including steps of:

allocating a memory area to which output data of the first process are output, on the local memory of the accelerator being determined.

[Form 10]

The accelerator control method according to Forms 8 or 9, further including steps of:

receiving a second process for storing data on the local memory of the accelerator beyond completion of a program having generated the data, registering the name assigned to the data to be stored and the identifier for the accelerator that stores the stored data on the local memory in the data management table by associating the name of the data and the identifier.

[Form 11]

The accelerator control method according to any one of Forms 8 to 10, further including steps of:

receiving a process request from a user program as a directed acyclic graph (DAG), determining the accelerator that stores input data of the process included in the DAG on the local memory, and controlling the accelerator determined to store input data of the process included in the DAG on the local memory, to execute a process included in the DAG.

[Form 12]

The accelerator control apparatus method to Form 11, further including steps of:

dividing input data of a process included in the DAG and storing divided input data on a plurality of local memories of a plurality of accelerators, determining the plurality of accelerators that store input data of a process included in the DAG on local memories, and controlling each of the plurality of the accelerators being determined to execute the process included in the DAG.

[Form 13]

The program according to the third aspect of the present disclosure.

[Form 14]

The program according to Form 4, wherein the program further causes the computer to execute processing of:

allocating a memory area to which output data of the first process are output, on the local memory of the accelerator being determined.

[Form 15]

The program according to Forms 13 or 14, wherein the program further causes the computer to execute processing of:

receiving a second process for storing data on the local memory of the accelerator beyond completion of a program having generated the data, registering the name assigned to the data to be stored and the identifier for the accelerator that stores the stored data on the local memory in the data management table by associating the name of the data and the identifier.

[Form 16]

The program according to any one of Forms 13 to 15, wherein the program further causes the computer to execute processing of:

receiving a process request from a user program as a directed acyclic graph (DAG), determining the accelerator that stores input data of the process included in the DAG on the local memory, and controlling the accelerator determined to store input data of the process included in the DAG on the local memory, to execute a process included in the DAG.

[Form 17]

The program according to Form 16, wherein the program further causes the computer to execute processing of:

dividing input data of a process included in the DAG and storing divided input data on a plurality of local memories of a plurality of accelerators, determining the plurality of accelerators that store input data of a process included in the DAG on local memories, and controlling each of the plurality of the accelerators being determined to execute the process included in the DAG.

It should be noted that the entire disclosed contents of the patent literature are incorporated and described in the present description by reference. The example embodiments can be subjected to changes and adjustments, without departing from the scope of the entire disclosure (including the claims)

of the present invention and further based on fundamental technical ideas thereof. Further, various combinations among and a selection from various disclosed elements (including elements of each claim, elements of each example embodiment, elements of each drawing, etc.) are possible, without departing from the scope of the entire disclosure of the present invention. In other words, it goes without saying that the present invention includes various variations and modifications that could be made by those skilled in the art, based on the entire disclosure including the claims and technical ideas. Specifically, with regard to the numerical range described in the present description, it should be interpreted that any numerical value or small range included in the range is specifically described even unless otherwise described.

The present invention has been described by using the above-described example embodiments as typical examples. However, the present invention is not limited to the example embodiments. In other words, the present invention can be applied with various forms that can be understood by those skilled in the art without departing from the scope of the present invention.

This application is based upon and claims the benefit of priority from Japanese patent application No. 2015-097033, filed on May 12, 2015, the disclosure of which is incorporated herein in its entirety by reference.

REFERENCE SIGNS LIST

1 Accelerator control apparatus
3 Accelerator control unit
4 Main memory
8 Information processing apparatus
21 User program
22 DAG creation unit
31 Program analysis unit
32 Task processing unit
33 Data management unit
34 Data management table
35 Memory management table
51 to 53 Accelerator
61 to 66 Data
71 to 74 Process
81 Shared memory
321 Task scheduler
322 Task execution unit
331 Data scheduler
332 Data transfer unit
511 to 513 Processor
521 to 523 Accelerator memory
821 to 823 Accelerator

The invention claimed is:

1. An accelerator control apparatus comprising a main memory and processing circuitry,
the main memory being configured to store a data management table storing a name assigned to data and an identifier for an accelerator that stores the data on a local memory by associating the name and the identifier;
the processing circuitry being configured to execute processing of:
a data management unit that is configured to determine, when receiving a first process that accepts data assigned with the name as input data, the accelerator that stores the data on the local memory, by referring to the data management table; and
a task processing unit that is configured to control the accelerator being determined by data management unit to execute the first process,
wherein the data management unit allocates a memory area to which output data of the first process are output, on the local memory of the accelerator being determined by the data management unit,
wherein when receiving a second process for storing data on the local memory of the accelerator beyond completion of a program having generated the data, the data management unit associates the name assigned to the data corresponding to the second process to be stored with the identifier for the accelerator that stores the stored data on the local memory, and registers the name of the data and the identifier in the data management table,
wherein the processing circuitry is further configured to execute processing of:
a program analysis unit for receiving a process request from a user program as a directed acyclic graph (DAG) and requesting the task processing unit to execute a process included in the DAG, and
wherein the data management unit determines the accelerator, among a plurality of accelerators, that stores input data of the process included in the DAG on the local memory, and the task processing unit controls the accelerator determined to store input data of the process included in the DAG on the local memory, to execute a process included in the DAG.

2. The accelerator control apparatus according to claim 1, wherein
input data of a process included in the DAG are divided and stored on a plurality of local memories of the plurality of accelerators,
the data management unit determines the plurality of accelerators that store input data of a process included in the DAG on local memories, and
the task processing unit controls each of the plurality of the accelerators being determined to execute the process included in the DAG.

3. The accelerator control apparatus according to claim 1, wherein
when input data of the first process are being saved on an outside of the accelerator, the data management unit loads the saved data onto the accelerator and,
when there is no sufficient free area in the local memory of the accelerator, the data management unit loads input data of the first process, after saving another piece of data on an outside of the accelerator.

4. The accelerator control apparatus according to claim 1, wherein
the data management unit allocates a memory area to which output data of the first process are output on the local memory of the accelerator being determined, after saving another piece of data on an outside of the accelerator being determined, when there is no sufficient free area to allocate a memory area to which output data of the first process are output on the local memory of the accelerator being determined.

5. The accelerator control apparatus according to claim 1, wherein
the accelerator comprises the local memory and an accelerator processor being configured to execute the first process by use of data stored in the local memory, and wherein
when input data of the first process are being saved on the main memory which is arranged outside of the accelerator, the data management unit loads the input data in the main memory onto the local memory of the accelerator, when there is no sufficient free area in the local memory of the accelerator, the data management unit loads input data of the first process, after saving another piece of data being stored in the local memory of the accelerator into the main memory.

6. The accelerator control apparatus according to claim 1, wherein when there is no sufficient free area to allocate a memory area to which output data of the first process are output on the local memory of the accelerator, the data management unit allocates the memory area to which output data of the first process are output on the local memory of the accelerator, after saving another piece of data being stored in the local memory, into the main memory being arranged outside of the accelerator.

7. An accelerator control method comprising:

storing a name assigned to data and an identifier for an accelerator that stores the data on a local memory, by associating the name of the data and the identifier;

determining, when receiving a first process that accepts data assigned with the name as input data, the accelerator that stores the data on the local memory, by referring to the data management table; and causing the accelerator being determined to execute the first process, wherein the method further comprises:

allocating a memory area to which output data of the first process are output, on the local memory of the determined accelerator, when receiving a second process for storing data on the local memory of the accelerator beyond completion of a program having generated the data, associating the name assigned to the data corresponding to the second process to be stored with the identifier for the accelerator that stores the stored data on the local memory, and registering the name of the data and the identifier in the data management table, receiving a process request from a user program as a directed acyclic graph (DAG), determining the accelerator, among a plurality of accelerators, that stores input data of the process included in the DAG on the local memory, and controlling the accelerator determined to store input data of the process included in the DAG on the local memory, to execute a process included in the DAG.

8. The accelerator control method according to claim 7, further comprising allocating a memory area to which output data of the first process are output on the local memory of the accelerator being determined.

9. A non-transitory storage medium storing a program that causes a computer to execute:

processing of storing a name assigned to data and an identifier for an accelerator that stores the data on a local memory, by associating the name of the data and the identifier;

processing of receiving a first process that accepts data assigned with the name as input data;

processing of determining the accelerator that stores the data on the local memory, by referring to the data management table; and processing of causing the accelerator being determined to execute the first process, wherein the processing of determining the accelerator allocates a memory area to which output data of the first process are output, on the local memory of the determined accelerator, wherein when receiving a second process for storing data on the local memory of the accelerator beyond completion of a program having generated the data, the processing of determining the accelerator associates the name assigned to the data corresponding to the second process to be stored with the identifier for the accelerator that stores the stored data on the local memory, and registers the name of the data and the identifier in the data management table, wherein the program is further configured to cause the computer to execute: processing of receiving a process request from a user program as a directed acyclic graph (DAG) and executing a process included in the DAG, wherein the processing of determining the accelerator determines the accelerator, among a plurality of accelerators, that stores input data of the process included in the DAG on the local memory, and wherein the processing of causing the accelerator controls the accelerator determined to store input data of the process included in the DAG on the local memory, to execute a process included in the DAG.

* * * * *